United States Patent [19]
Haley

[11] 3,753,618
[45] Aug. 21, 1973

[54] MONOCHROMATOR

[75] Inventor: Floyd C. Haley, La Canada, Calif.

[73] Assignee: Ultra-Violet Products, Inc., San Gabriel, Calif.

[22] Filed: Feb. 10, 1972

[21] Appl. No.: 225,248

[52] U.S. Cl............. 356/100, 350/162 R, 350/271
[51] Int. Cl............................ G01j 3/18, G01j 3/04
[58] Field of Search...................... 350/271, 162 R; 356/74, 99–101

[56] References Cited
UNITED STATES PATENTS
| | | | |
|---|---|---|---|
| 3,594,084 | 7/1971 | Turner | 356/100 |
| 3,567,322 | 3/1971 | Brehm et al. | 356/100 X |
| 3,451,744 | 6/1969 | de Mey | 350/271 |
| 2,995,973 | 8/1961 | Barnes et al. | 356/99 |

OTHER PUBLICATIONS

Codling et al., Journal of Physics E: Scientific Instruments Vol. 3, September 1970, pages 685–689.

*Primary Examiner*—Ronald L. Wibert
*Assistant Examiner*—F. L. Evans

[57] ABSTRACT

A compact monochromator with entrance and exit slits nearly incident permitting insertion and removal of the monochromator at a focal point without requiring change in the system. A monochromator with entrance and exit slits each formed by an edge and a mirror. A monochromator with entrance slit and mirror directing the beam through an aperture in a grating to a collimating mirror, defining a light path from the entrance slit and mirror to the collimating mirror to the grating and back to the collimating mirror to the exit mirror and slit.

8 Claims, 9 Drawing Figures

Patented Aug. 21, 1973 3,753,618
2 Sheets-Sheet 1
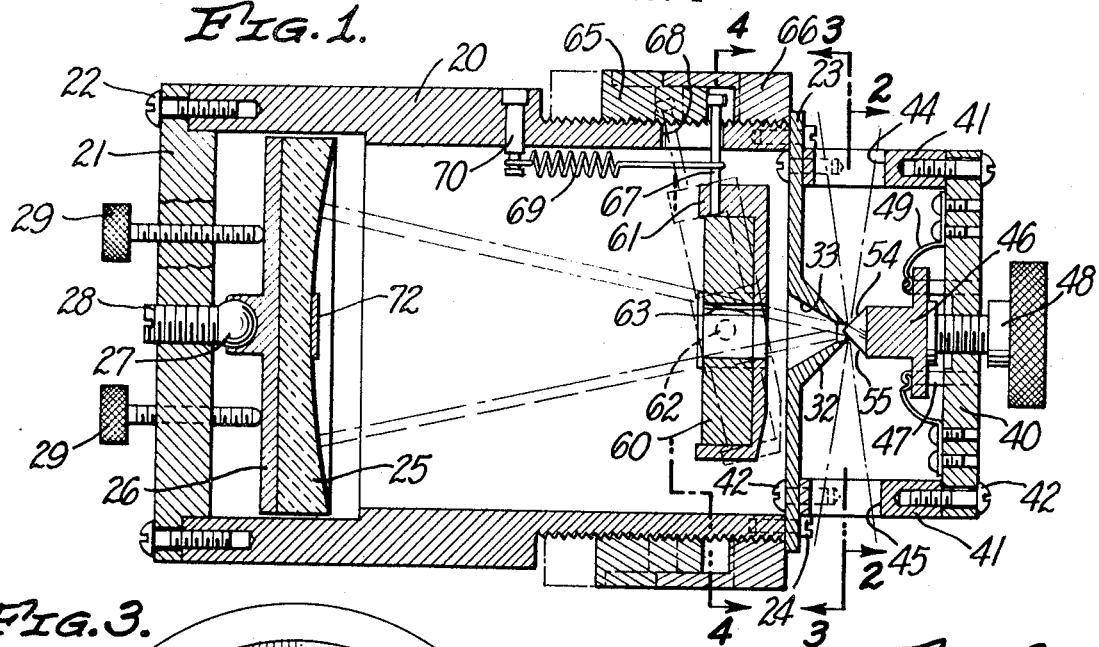
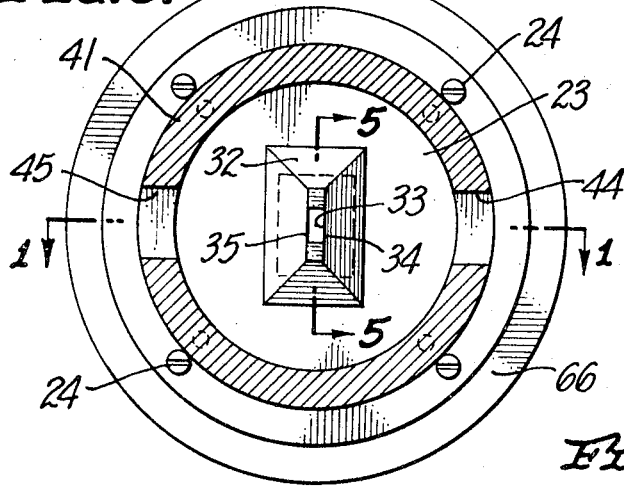
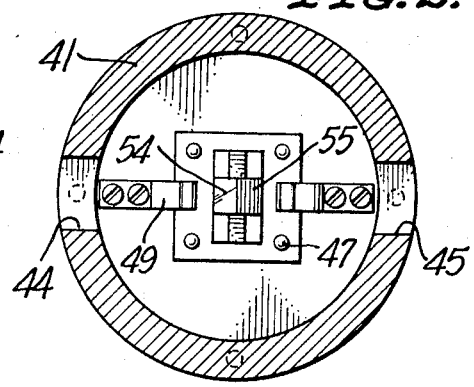
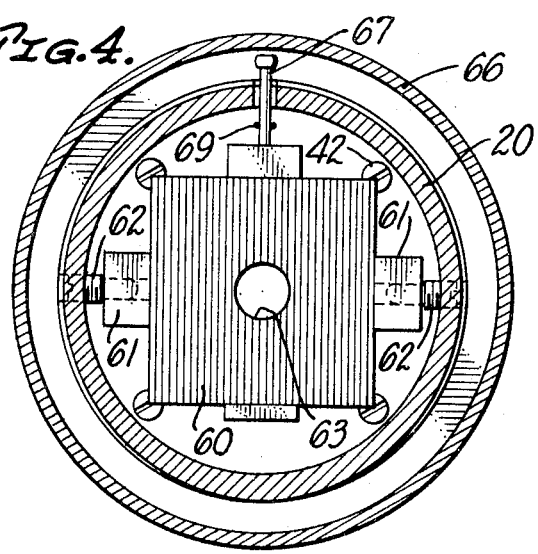
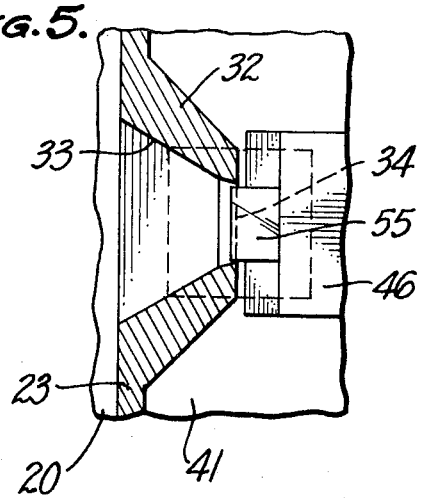

Patented Aug. 21, 1973
3,753,618
2 Sheets-Sheet 2
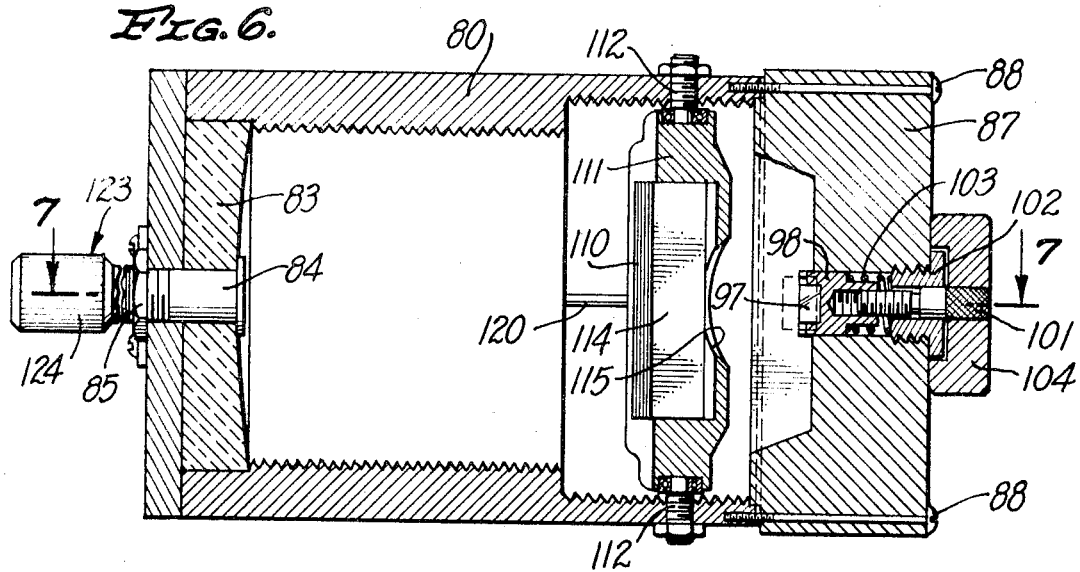
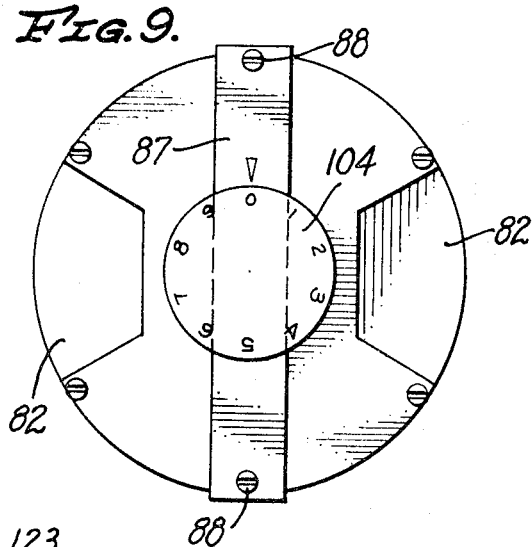
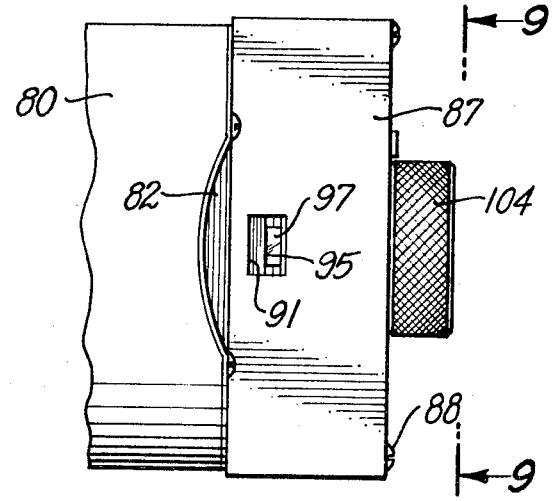
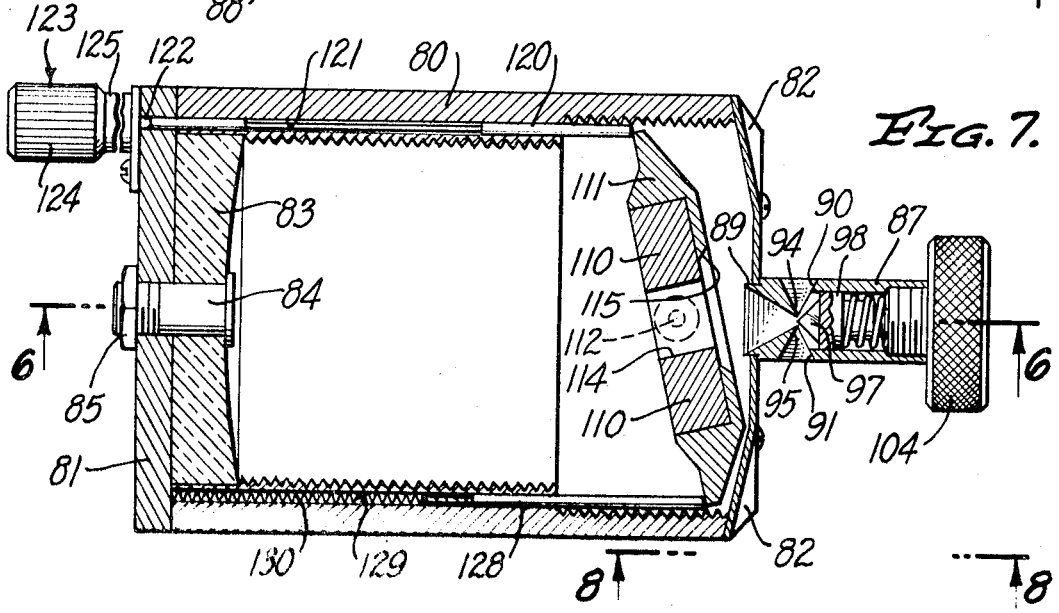

MONOCHROMATOR

This invention relates to monochromators, that is, an optical instrument having a specular or broad band light beam as an input and providing a narrow band or specific wavelength beam as an output. The monochromator usually has an adjustment or control which permits varying the wavelength of the exiting beam. A number of monochromators have been utilized in the past incorporating various combinations of slits, gratings, prisms and mirrors. In a typical monochromator, the incoming beam is directed through an entrance slit to a grating or a prism. The grating reflects the various wavelengths of the beam at different angles and the prism refracts the various wavelengths at different angles. A narrow band of this spread out beam is selected by the exit slit for transmission onward. More complex monochromators may utilize an entrance slit, a grating, an intermediate slit, a prism and an exit slit to provide higher selectivity.

The conventional monochromators are relatively large and require complex mechanisms and are expensive. It is an object of the present invention to provide a new and improved monochromator which is considerably smaller than the conventional devices and which is simpler in design and less expensive to manufacture and install. A particular object of the invention is to provide a new and improved monochromator wherein the entrance and exit slits are nearly incident thereby permitting insertion and removal of the monochromator from an instrument without requiring any change in instrument set-up. A further object is to provide such an instrument with nearly incident entrance and exit slits wherein the slit width control can be withdrawn to a position such that the incoming beam may exit without any interference from the monochromator, without requiring removal of the monochromator.

The invention contemplates a monochromator with entrance an exit slits each formed by an edge and a mirror, with the entrance slit mirror directing the incoming beam through an apertured grating to a collimating mirror for reflection to the grating. The beam from the grating is reflected by the collimating mirror back through the aperture of the grating to the exit slit mirror, completing the beam path through the monochromator.

Other objects, advantages, features and results will more fully appear in the course of the following description. The drawings merely show and the description merely describes the preferred embodiments of the present invention which are given by way of illustration or example.

In the drawings:

FIG. 1 is a longitudinal sectional view of a monochromator incorporating the invention;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1;

FIG. 5 is an enlarged partial sectional view taken along the line 5—5 of FIG. 3;

FIG. 6 is a view similar to that of FIG. 1 of a monochromator incorporating an alternative and presently preferred embodiment of the invention;

FIG. 7 is a sectional view taken along the line 7—7 of FIG. 6;

FIG. 8 is a partial side view taken along the line 8—8 of FIG. 7; and

FIG. 9 is an end view taken along the line 9—9 of FIG. 8.

Referring to the monochromator in FIGS. 1–5, the housing includes a cylindrical shell 20 with an end plate 21 attached by screws 22 and another end plate 23 attached by screws 24. A concave mirror 25 is carried on a plate 26 having a socket riding on a ball 27 of a screw 28. The screw 28 may be rotated in the plate 21 to advance the mirror 25 within the housing. Adjusting screws 29 are mounted in the plate 21 and engage the mirror plate 26 for adjusting the angle of the mirror 25 within the housing.

A pyramid 32 is formed on the plate 23 with an opening 33 defined by edges 34, 35.

A bar 40 is mounted on the plate 23 with brackets 41 and screws 42. A beam entrance opening 44 is provided in one of the brackets 41 and a beam exit opening 45 is provided in the other bracket. A slit mirror carrier 46 rides on guide pins 47 and is moved toward and away from the edges 34, 35 by a manually rotatable shaft 48 threadedly mounted in the plate 40. Springs 49 are carried on the plate 40 and engage the carrier 46 urging the carrier away from the edges 34, 35.

Slit mirrors 54, 55 are carried on the end of the carrier 46, the mirrors typically being reflecting surfaces of a prism. The included angle between the mirrors is slightly greater than 90°, typically 91°, with the apex of the prism forming the two mirrors normally being positioned between the edges 34, 35, as seen in FIGS. 1 and 5.

A grating 60 is mounted in a frame 61 which is supported on pivot pins 62 threaded into the shell 20. A hole 63 is provided through the grating and the frame.

Rings 65, 66 are threadedly mounted on the exterior of the shell 20. A rod 67 is fixed in the frame 61 and projects through a slot 68 of the shell into the space between the rings 65, 66. A tension spring 69 is connected between a pin 70 in the shell and the rod 67, urging the rod into engagement with the ring 65. The angular position of the grating is adjusted by moving the ring 65 on the shell 20, with the ring 66 serving as a locking ring.

The edge 34 and the mirror 54 define the entrance slit. Similarly, the edge 35 and the mirror 55 define the exit slit. The width of the slits is controlled by moving the carrier 46 in and out. In operation, a beam enters through opening 44 and passes through the entrance slit. The beam is reflected by the mirror 54 through the aperture in the grating to the collimating mirror 25 which reflects a collimated beam to the grating. A portion of the light reflected by the grating is collected by the mirror 25 and focused at the exit slit through the grating opening and the mirror 55. The narrow band beam leaving the exit slit passes out through the opening 45. A nonreflective spot 72 or alternatively, an opening, is provided on the reflecting surface of the mirror 25 at the center to prevent direct reflection from the slit mirrors back to the slit mirrors.

The monochromator of FIGS. 1–5 is compact and may be made quite small. Units presently being manufactured are about 3¼ inches outside diameter and about 6 inches overall length. The slit width is typically in the order of 1 mm. and the entrance and exit slit edges 34, 35 are very close, being only a few millimeters apart and less than half a centimeter apart. With the nearly incident entrance and exit slits, the monochromater may be inserted into and removed from an optical system without requiring any changes in the optical system, with the entrance and exit slits being at a focal point in the optical system. Also, the mirrors 54, 55 may be moved away from the slit edges (to the right in FIG. 1) removing the mirrors entirely from the entering and exiting beam paths so that the monochromator action can be omitted and obtained as desired in the operation of the overall system.

An alternative embodiment of the monochromator is illustrated in FIGS. 6–9. The housing is formed of a cylindrical shell 80 with an end plate 81 and an end plate 82. A concave mirror 83 is carried on the end plate 81 with a stud 84 and nut 85. The head of the stud 84 provides the nonreflecting spot at the center of the mirror 83. A bar 87 is mounted on the shell 80 over the end plate 82 by screws 88. The inner section 89 of the bar 87 projects through an opening in the end plate 82. An entrance opening 90 is provided in one side of the bar 87 and an exit opening 91 is provided in the opposite side. Another opening 92 is provided in the inner end 89 of the bar, with the entrance edge 94 between the openings 90, 92 and with the exit edge 95 between the openings 91, 92. A prism 97 with reflecting surfaces providing the entrance slit mirror and exit slit mirror is supported on a carrier 98. A shaft 101 rotates in a bushing 102 mounted in the bar 87, with the threaded inner end of the shaft 101 engaging a threaded opening in the carrier 98 for moving the carrier in the bar 87. A spring 103 is positioned between the bushing 102 and carrier 98 for eliminating play in the drive. A knob 104 is mounted on the shaft 101 for manual adjustment of the slit widths.

A grating 110 is carried in a frame 111 which is pivotally mounted in the shell 80 on studs 112. In this embodiment the grating 110 is shown as two pieces with a central space 114 therebetween providing the centeral aperture for light passage between the slits and the collimating mirror. An opening 115 is provided in the frame 111 for light passage. The gratings in both embodiments may be held in place with cement or by clips (not shown) or by other suitable means.

A mechanism is provided for adjusting the angular position of the grating. A rod 120 is positioned in a passage 121 in the shell 80, with one end of the rod engaging the grating frame 111 and with the other end of the rod engaging a shaft 122 of a micrometer type adjustment device 123. A knob 124 rotates on a boss 125 mounted on the end plate 81, with rotation of the knob serving to advance and retract the shaft 122. Another rod 128 is positioned in a passage 129 in the shell 80, with one end of the rod engaging the grating frame 111 and with the other end engaging a spring 130 positioned in the passage 129.

In operation, the spring urges the rod 128 against the grating frame thereby urging the grating frame against the rod 120 and this rod against the shaft 122.

The operation of the monochromator of FIGS. 6–9 is the same as the operation of the monochromator of FIGS. 1–5. It is preferred that the interior of the shell 80 be non-reflective and one mechanism for reducing reflection is to leave the interior of the shell 80 rough turned, as indicated by the serrations in FIGS. 6 and 7. The interior may also be coated with nonreflective material.

While being compact as described above the monochromator also provides superior performance. One model of the instrument has an $f$ number of 1.12 and with a grating blazed at 2400A, has a dispersion of 125 A per mm at the exit slit.

I claim:

1. In a monochromator for selecting a narrow band from an incoming light beam, the combination of:

a housing;

a concave mirror mounted in said housing;

slit means mounted in said housing defining entrance and exit slits; and a grating mounted in said housing between said slit means and said concave mirror, said grating having an aperture for light passage between said slits and concave mirror;

said slit means including spaced first and second edges and first and second slit mirrors, with said first edge and slit mirror defining said entrance slit and with said second edge and slit mirror defining said exit slit, and means for positioning said first slit mirror for reflecting an incoming beam from said entrance slit to said concave mirror through said grating aperture, with said concave mirror reflecting the beam from said first slit mirror as a collimated beam to said grating and reflecting a return collimated beam from said grating to said second slit mirror through said grating aperture, and means for positioning said second slit mirror for reflecting the beam from said concave mirror through said exit slit, with said concave mirror including means defining a nonreflecting zone at the center thereof for preventing direct reflection from said entrance slit to said concave mirror and back to said exit slit.

2. A monochromator as defined in claim 1 including:

a frame for holding said grating;

pivot means for mounting said frame in said housing for pivoting about an axis parallel to said slits; and drive means carried by said housing for moving said grating on said axis.

3. A monochromator as defined in claim 2 wherein said drive means includes:

mating threaded nut and shaft mounted on said housing, with rotation of said nut moving said shaft;

a first rod sliding in a first passage in said housing with one end of said rod engageable with said frame and with the other end engageable with said shaft;

a second rod sliding in a second passage in said housing with one end of said rod engageable with said frame; and a spring in said second passage and urging said second rod into engagement with said frame urging said frame into engagement with said first rod urging said first rod into engagement with said shaft.

4. A monochromator as defined in claim 2 wherein said drive means includes:

first and second rings threadedly mounted on said housing, with said rings engageable with each other for locking on said housing and defining a zone between said rings;

a shaft carried on said frame and projecting into said zone; and a spring carried on said housing and coupled to said shaft urging said shaft into engagement with one of said rings.

5. A monochromator as defined in claim 1 wherein said grating aperture is formed by a hole through the grating.

6. A monochromator as defined in claim 1 wherein said grating aperture is formed by two individual gratings spaced from each other with the aperture therebetween.

7. A monochromator as defined in claim 1 wherein said first and second edges are parallel and said first and second mirrors are mounted in a wedge form with the apex of said wedge positionable between said edges defining said first and second slits, with the beam path to said entrance slit in line with the beam path from said exit slit.

8. A monochromator as defined in claim 7 including a drive screw mounted on said housing in engagement with said wedge form slit mirrors for moving said slit mirrors toward and away from said edges for varying both slit widths and for removing said slit mirrors from said in line beam paths.

* * * * *